United States Patent
Mack et al.

[11] Patent Number: 5,944,860
[45] Date of Patent: Aug. 31, 1999

[54] AIR PLENUM FILTER ADAPTER COMPONENT

[75] Inventors: Joseph A. Mack, Phoenix, Ariz.; Wallace Ronald Saldin, Bloomington, Minn.; Brad A. Terlson, Maple Grove, Minn.; Edward L. Schwarz, Minneapolis, Minn.

[73] Assignee: Honeywell Inc., Minneapolis, Minn.

[21] Appl. No.: 08/993,459

[22] Filed: Dec. 18, 1997

[51] Int. Cl.⁶ ................................................ B01D 46/10
[52] U.S. Cl. .................. 55/492; 55/496; 55/497; 55/501; 55/502; 55/DIG. 31; 55/DIG. 35
[58] Field of Search .............. 55/492, 497, 496, 55/501, 502, 511, 513, 516, DIG. 31, DIG. 35

[56] References Cited

U.S. PATENT DOCUMENTS

| | | |
|---|---|---|
| 3,789,514 | 2/1974 | Faust et al. ................. 55/DIG. 31 |
| 4,177,050 | 12/1979 | Culbert et al. . |
| 4,584,005 | 4/1986 | Allan et al. ................. 55/DIG. 31 |
| 4,701,196 | 10/1987 | Delany . |
| 4,865,637 | 9/1989 | Gruber ...................... 55/DIG. 31 |
| 4,961,849 | 10/1990 | Hull et al. .................. 55/DIG. 31 |
| 4,963,171 | 10/1990 | Osendorf ................... 55/DIG. 31 |
| 5,032,272 | 7/1991 | Mould ........................ 55/DIG. 31 |
| 5,143,604 | 9/1992 | Bernard et al. ............. 55/DIG. 31 |
| 5,176,570 | 1/1993 | Liedl .......................... 55/DIG. 31 |
| 5,332,409 | 7/1994 | Dralle ................................ 55/516 |
| 5,458,667 | 10/1995 | Poggi et al. . |
| 5,743,927 | 4/1998 | Osendorf ................... 55/DIG. 31 |

*Primary Examiner*—Jay H. Woo
*Assistant Examiner*—Minh-Chau T. Pham
*Attorney, Agent, or Firm*—Edward L. Schwarz

[57] ABSTRACT

A frame supports a deep filter element to allow the filter element to be installed in a duct's conventional air intake opening as a replacement for a conventional shallow filter element. The frame has a flange to mate with a surface of the intake opening's interior flange. In one embodiment, two identical side panels are assembled with the relatively stiff end panels of a particular filter element to form the frame.

14 Claims, 2 Drawing Sheets

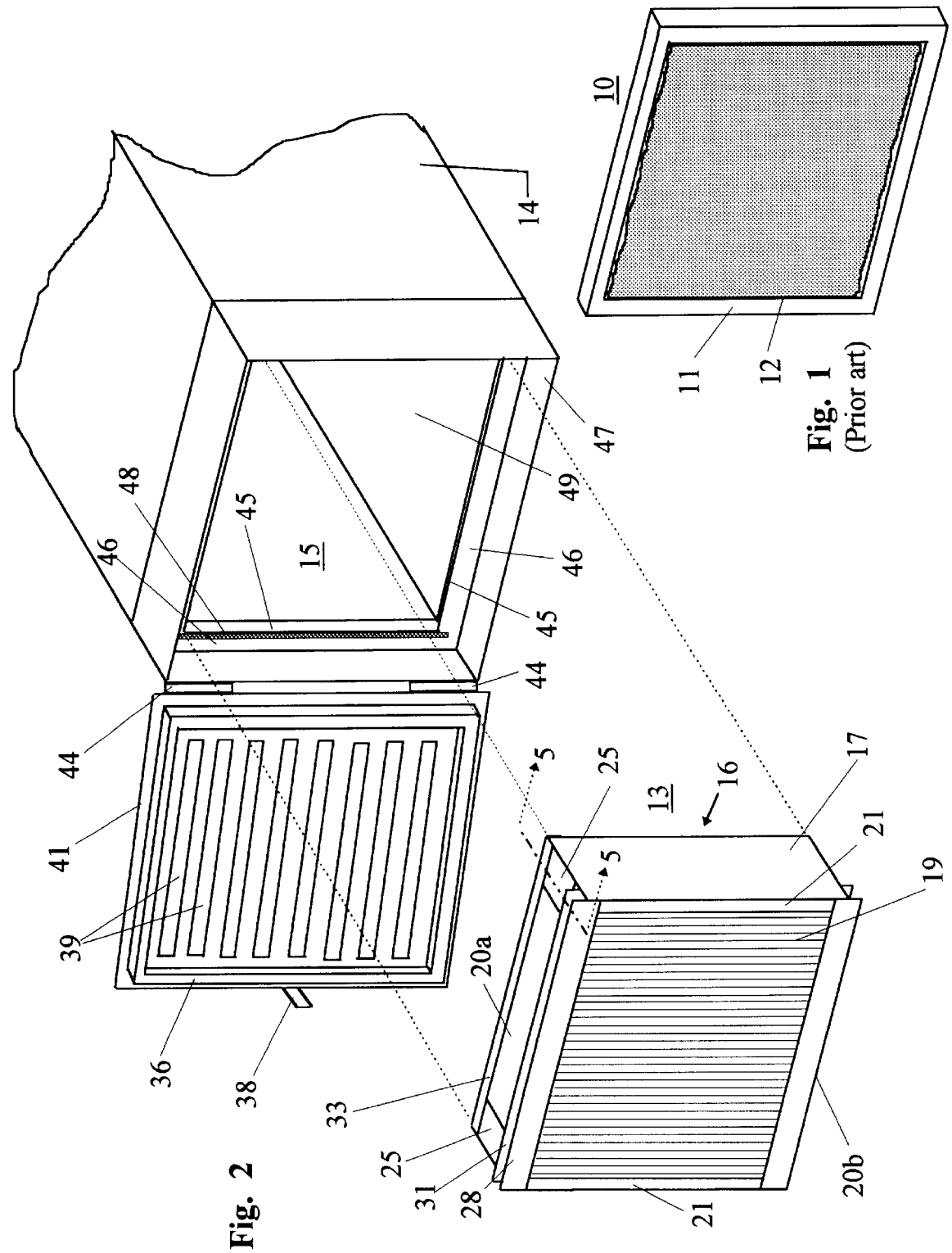

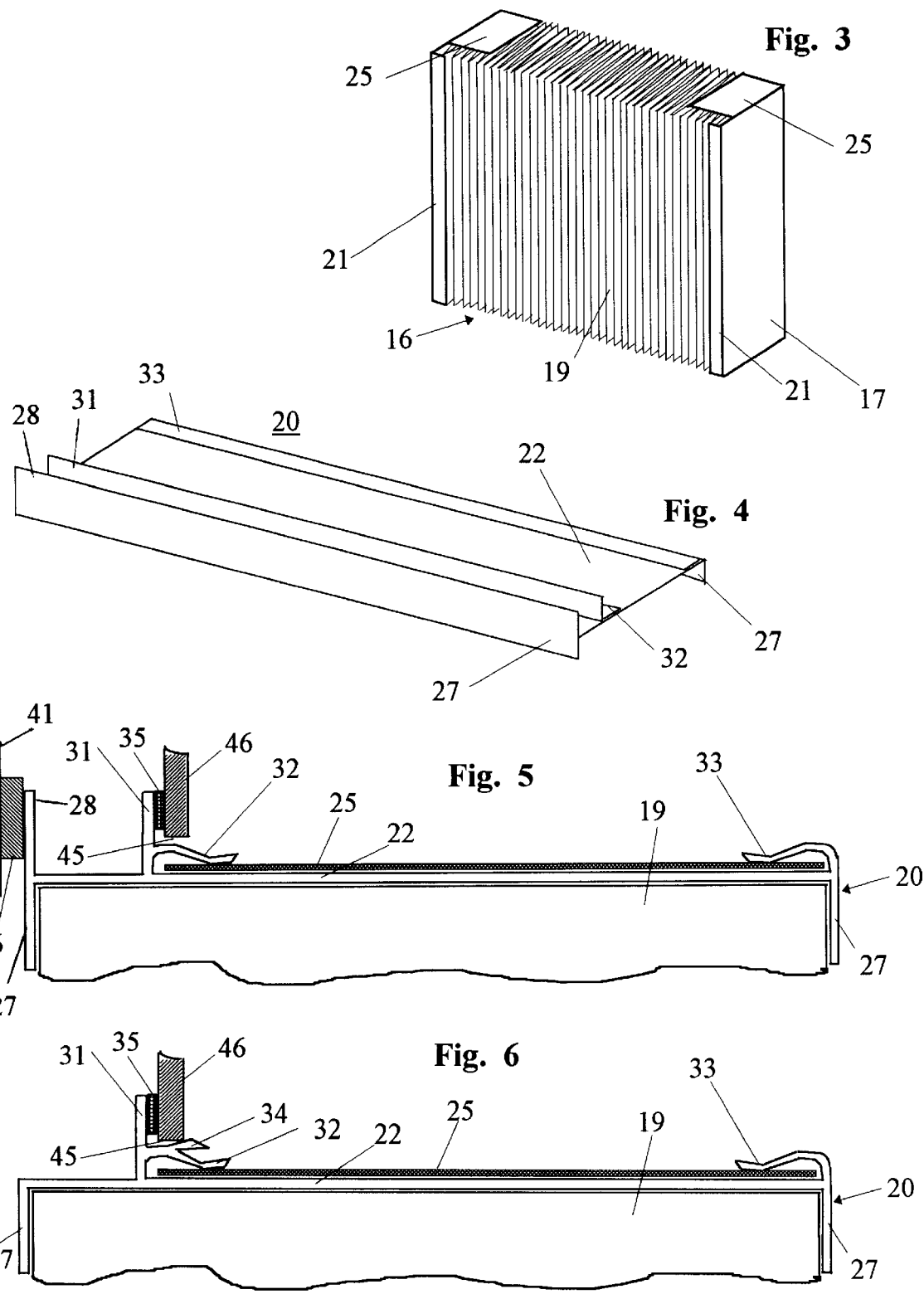

AIR PLENUM FILTER ADAPTER COMPONENT

BACKGROUND OF THE INVENTION

It is customary to filter the air provided to occupied spaces by heating, ventilating, and air conditioning (HVAC) equipment. One convenient and effective way to do this is to filter the air entering the return air intake opening in the plenum or duct leading to the furnace or air conditioner. A typical air circulation system of a house for example, has a fan which while operating constantly draws air present within the occupied space into the intake opening for reheating or reconditioning, and this air is caused to pass through a filter to remove particulate contamination. The filter may be a simple mechanical filter with a disposable or renewable element, or may be electronic. The following description involves mechanical filters which do nothing more than trap these particles on the upstream filter surface or adsorbs them within the filter's pores through which the air passes.

It is helpful at this point to define terms that will be frequently used in the description to follow. The medium of an air filter is the actual material which performs the filtering function. The air filter element is the disposable unit including the medium, and which is installed in, and after filling with trapped particles is removed from a plenum, duct, or housing. The air filter unit or simply air filter, is the entire filter assembly including the element and the non-disposable structure in which the element is mounted.

In residential systems, the medium often comprises a nominally one inch (2.5 cm.) thick rectangular woven glass fiber mat configured as a box-type filter element. The length and width dimensions of these filter media vary with the particular installation, but are typically each between one and two feet (30.5 cm. to 61 cm.). A flexible cardboard edging having a U-shaped cross section encloses the edge of the mat's periphery to form the air filter element and gives the element a generalized box shape. The edging provides some stiffness for the element. Other types of elements use pleated filter paper as the medium, again having the same nominal 1 in. thickness and U-shaped edging. These filter elements are available in a variety of widths and lengths to conform with the dimensions of the opening in which the element is to be installed. This filter format will be referred to hereafter as a shallow filter element or shallow format filter.

For systems having return air filtration and using mechanical filtration, a shallow filter element is often placed in the return air intake opening. These openings have centrally or inwardly projecting sheet metal or plastic flanges around the entire periphery of the opening. The flanges' outer surfaces all lie in a common plane. The filter's edging is pressed against the flange's outer surface by force from a grille cover having an internal ridge which presses against the edging's outer surface creates a nearly air-tight seal between the outer flange surface and the inwardly facing edging surface. This air-tight seal forces almost all of the air entering the plenum to pass through the filter element medium.

As one would expect, different types of air filters have different levels of efficiency. "Efficiency" in this context refers to the percentage of the total number of particles in the air stream within a given size range which the filter element can trap. The efficiency of filters varies with different particle size ranges. For example, a high efficiency filter medium can trap a significant percentage of particles whose size is on the order of 0.3 micron, where a low efficiency medium traps relatively few of them. There is also the consideration of overall efficiency as opposed to filter medium efficiency. Overall efficiency takes into account the unavoidable air leakage around a filter element mounted in its housing. Leaking air is completely unfiltered. Its particle load pollutes the stream of filtered air, resulting in an overall efficiency lower than the medium efficiency.

But efficiency is not the only measure of medium quality. It is also important that a filter not create a large pressure drop in the air passing through it. A large pressure drop requires a more powerful fan to force the required air volume through it. And if the pressure drop is too great, the medium will deflect and perhaps even burst or tear as the load of trapped debris obstructs ever more pores within the medium. The amount of pressure drop presented by a particular medium depends largely on the number of pores or openings per unit area of the medium, on the average minimum cross section area of the pores, and of course on the total area of the medium through which the air flows. To a lesser extent, pressure drop is also dependent on the medium thickness, in the same manner that a long duct creates more resistance to air flow through than does a short duct, other things being equal.

Obviously, as a filter element loads up with debris during use, its pressure drop increases. This leads into a further consideration for filters, that of carrying capacity and filter element life. "Carrying capacity" refers to the number of particles the filter element can trap per unit area projected to the air stream before clogging up to a point where the ability to remove particles is impaired and/or the pressure drop across the filter element becomes unacceptable. ("Dust-holding" capacity is an industry term which we intend to be substantially equivalent to carrying capacity.) Other things being equal, carrying capacity is directly related to total medium area. The capacity of mat filters which trap some of the particles within their volume may also depend to some extent on their thickness. Carrying capacity is one factor in determining the life of the element and thus the cost of filtering the air.

Advances in filter technology has led to improvements in each of these characteristics. Nevertheless, it is still true that there are tradeoffs between efficiency, pressure drop, and carrying capacity. For example, as a filter medium becomes more efficient, its pressure drop typically increases because the individual pores become smaller, other things being equal. Of course, it may be possible to add more pores per unit area, but the problem of adding pores is not trivial. Carrying capacity is closely related not only to the number of pores or area available for adsorbing particles, but also to pore size. As the average size of the pores decreases, efficiency usually increases, but the increased number of particles trapped per second and smaller pores cause the medium to more quickly clog, reducing its life.

An easy way to minimize pressure drop and maximize capacity is to increase total medium area. This fact has led to the development of pleated filters. These pleated filters are made from a long strip of filter paper medium which is folded back and forth on itself to form a series of pleats. So long as the adjacent pleat panels do not touch each other the air can easily flow through the individual panels. In order to maintain the topology of the pleats under the force created by the normal pressure drop across the medium, it is possible to insert combs on the downstream side of the medium which have individual teeth between each pair of adjacent pleat panels to prevent the pleats from collapsing against each other from the force created by the pressure drop across individual panels.

Mechanical filter elements typically now in use in HVAC systems lack the efficiency which some experts believe is needed for adequate quality of the filtered air. Environmental health studies and empirical experience both show that it is not only the larger particles which these shallow format mat and pleated filters do trap that affect air quality. Smaller particles such as tobacco smoke, mold spores, bacteria, pollen, etc. which pass through present day filters without being trapped, can also cause allergy or health problems for some people. And of course, even small particles can accumulate to an extent which creates a film of dust on hard surfaces and causes fabrics on furniture and in window treatments to become dirty or discolored. Secondly, shallow format filters have a relatively small carrying capacity.

More recently, improved filter elements have been developed whose pressure drop and carrying capacity is superior to that of shallow format mat and pleated filters. These elements typically have relatively deep pleats (4–5 in. or 10–12.5 cm.) to provide a relatively large medium area providing the improved pressure drop and carrying capacity. These deep pleat elements are intended for use in return air ducts having chambers capable of receiving such filter elements. In a preferred design, the filter elements collapse into a relatively small volume for shipping. They have relatively rigid cardboard or plastic end strips or panels which detachably mate with reusable side panels to form a reasonably rigid rectangular filter element assembly. See U.S. Pat. Appl. Ser. No. 08/738,276 by Osendorf et al and "filed Oct. 26, 1996, which application was continued in application Ser. No. 08/967,115 filed Nov. 12, 1997 and issued on Nov. 24, 1998 as U.S. Pat. No. 5,840,094". example of such a collapsible filter element which can be assembled into a deep format pleated filter element using a pair of special side panels. The filter element assembly is inserted into the chamber, placing the filter element directly in the return air stream. The chamber's design seals the edges of the filter assembly reasonably well against peripheral leakage, improving the overall filtering efficiency. Such a deep pleat filter element and indeed, any type of filter element substantially thicker than shallow format filter elements and to which the invention described below is applicable, will be called a deep filter element or deep format filter.

It would be advantageous to replace shallow format return air intake opening-mounted filters with deep format pleated filters. However, the dimensional disparity between these deep format pleated filter elements and the shallow format filter element does not allow the former to directly replace the latter in a return air opening installation.

BRIEF DESCRIPTION OF THE INVENTION

We have modified the side panel's design described above for assembly with a collapsible deep pleat filter element or other filter element to allow such a deep filter element assembly to replace the shallow filter element in many return air intake openings. In addition, there are other designs for frames intended to support deep format filter elements which fall within the broad definition of this invention.

One form of this invention comprises a component for mating with an end panel of a deep format filter element to form in combination therewith a filter assembly suitable for replacing a shallow rectangular filter element in a filter mount opening of a return or other air intake duct. The filter assembly is designed to fit into a filter mount opening having an interior peripheral duct flange having a mating surface facing outwardly from the duct and an interior edge, and which is adapted to receive a shallow format filter element within a recess formed by the periphery of the opening and the peripheral flange's mating surface. The component comprises an elongate side panel having oppositely facing inner and outer surfaces and first and second ends. Inner and outer edges run between the first and second ends. There is at each end of the component, a feature for mating with a filter element's end panel. The component has a linear sealing flange mounted on and projecting from the outer surface thereof. The sealing flange has a sealing face generally facing the inner edge of the component and extending along substantially the entire length of the component.

The filter element with which this component cooperates has an end panel attached to each end pleat of the medium. Two components are required, each forming one side panel of the completed filter assembly. Mating the two features of two components to the two end panels of a suitable filter element creates a rectangular deep format filter element. When so assembled, the filter element will typically fit at least part way into the air duct past the interior edge of the duct flange. The sealing surfaces of the two components' sealing flanges mate with the mating surface of the duct flange to form a relatively air-tight seal between them.

By properly selecting the length of the two components, the filter element's end panels can be made to fit closely to the adjacent interior edges of the duct flange. Gaskets or air seal strips can be placed along these interior edges to close the spaces between the element's end panels and the interior edges of the duct flange, and cause almost all of the air entering the duct to pass through the filter medium.

BRIEF DESCRIPTION OF THE DRAWINGS

FIG. 1 is a perspective view of a typical prior art filter element.

FIG. 2 is a partially exploded perspective drawing of a air intake and deep format filter assembly according to the invention.

FIG. 3 is a perspective view of the filter element shown in FIG. 2 as part of the filter assembly.

FIG. 4 is an enlarged perspective view of the side panel forming a part of the filter assembly of FIG. 2.

FIG. 5 is a further enlarged cross section of the side panel and the mated flap of the filter element's end panel.

FIG. 6 shows a variation of the FIG. 5 side panel cross section.

DESCRIPTION OF THE PREFERRED EMBODIMENTS

FIG. 1 is an example of the common shallow format mat filter element 10 having a cardboard edging 11 on the mat-type medium 12. Edging 11 and medium 12 are somewhat resilient and compressible in the thickness dimension.

FIG. 2 shows a typical installation incorporating the invention. Turning first to the known and conventional aspects of FIG. 2, an air duct or plenum 14 has a return or fresh air intake at 15 defined by skirt 47. Plenum 14 can take a variety of forms, and that shown is only one possible example. Other installations may find intake 15 mounted into a ceiling or wall or forming a transition to a duct having a round or elongated rectangular form. A grille or cover 41 is held by hinges 44 allowing grille 41 to be swung between the open or access position shown, into a closed or shut position where grille 41 completely covers intake 15. A latch 38 holds the grille 41 in its closed position. Grille 41 has a plurality of vents or slots 39 through which air can easily pass during normal operation. In many installations there is a peripheral ridge or projection 36 surrounding vents 39 on the inside surface of grille 41 and having outside dimensions allowing ridge 36 to fit within skirt 47 when grille 41 is closed.

Within intake 15 there is an interior peripheral duct flange 46 having interior edges 45 which cooperatively form a smaller opening 49 to duct 14. Duct flange 46 has an flat external surface which cooperates with skirt 47 to form a recess for receiving a standard shallow format filter 10 such as shown in FIG. 1. In some of the designs having a ridge 36, when grille 41 is swung into its closed position, the spacing between ridge 36 and duct flange 46 is such as to clamp filter element 10 within this recess. In such an arrangement, flange 36 presses the edging 11 of filter element 10 against the exterior surface of duct flange 46 to compress edging 11 slightly and create a reasonably good air seal between these components. This arrangement causes nearly all of the air entering duct 14 to pass through element 10. Other arrangements rely on pressure drop across the filter element 10 to press the filter element edging 11 against flange 46 to create an air seal. In any case, the interior edges of flange 46 will typically form a rectangular intake 15 to duct 14.

In explaining the features of FIG. 2 which embody the invention, it is clearest if the structure of filter element assembly 13 and its individual components is first explained by explaining the features of FIGS. 3–5. Filter assembly 13 incorporates filter element 16 and two identical side panels 20a and 20b shown in FIG. 4. The intention is to assemble these three individual components into filter assembly 13 by connecting two side panels 20 to two end panels 17 (the left end panel being hidden in FIGS. 2 and 3) of element 16.

Filter element 16 includes a deep format pleated medium 19 having one end panel 17 attached to each of the two outer pleats of medium 19. Each end panel 17 includes top and bottom assembly tabs 25, only the top tabs 25 being shown in FIGS. 2 and 3. End panels 17 can be formed of any reasonably stiff and non-porous material such as cardboard or plastic sheet. We prefer cardboard because it is cheap and easy to score so as to create hinge or fold lines such as for tabs 25. A pair of stiffening flanges 21 project at 90° angles from the main body of panel 17. One of these flanges 21 for each end panel 17 is hidden behind the main body of panel 17. It is easy to score the end panel 17 material to create a fold line for creating the flanges 21.

Side panel 20 shown in FIG. 4 is designed to mate in pairs with the assembly tabs 25 of filter element 16 to form filter assembly 13 of FIG. 2 (wherein the side panels are designated 20a and 20b). Side panel 20 is a variation of the similar article shown in the previously mentioned with U.S. Pat. No. 5,840,094. We prefer to form side panels 20 from a relatively flexible plastic. As shown in FIG. 4, side panel 20 in essence includes five different flanges, all extending the entire length of panel 20. This allows side panels 20 to be formed by cutting pieces from extruded plastic material of the cross section shown in FIG. 5, extrusion being a preferred way to create components of this shape and material.

Side panel 20 shown in FIG. 4 includes flanges 32 and 33 formed on what is an outer surface of panel 20 and which create narrow slots or spaces (best seen in FIG. 5) between themselves and a main panel portion 22. The assembly tabs 25 of filter element 16 are designed to slip into the slot defined by flanges 32 and 33 on the one hand, and main panel 22. This arrangement duplicates that revealed in the aforementioned Osendorf, et al. application.

Side panel 20 has stiffening flanges 27 running along its entire length on each edge of main wall 22 and extending in the direction which an inner surface of panel 20 faces. There is a sealing flange 31 attached to the outer surface of panel 20 and which extends at approximately right angles to this outer surface. In one embodiment, there is a resilient foam rubber gasket or weather strip 35 on the surface of flange 31 facing flanges 32 and 33. Although not present on the commercial embodiment of this invention, there is also a support flange 28 which may be an extension of the adjacent flange 27 as shown in FIG. 4, or be offset from flange 27.

The filter assembly 13 of FIG. 2 is formed by slipping tabs 25 into the slots formed by flanges 32 and 33, one tab from each end panel 17 into the slot of one side panel 20a or 20b. Flanges 21 should fit inside flanges 27 so as to keep them tucked firmly against medium 19. When so assembled, filter assembly 13 is remarkably rigid, with the edges of medium 19's pleats pressing firmly against the inner surface of each side panel 20's main wall 22. In essence end panels 17 and side panels 20a and 20b cooperate to form a frame for supporting medium 19 and for adapting medium 19 to fit into the recess formed by flange 46 and skirt 47.

The user inserts filter assembly 13 into the filter recess of FIG. 2 formed by flange 46 and skirt 47, with filter element 16 projecting past the interior edges 45 of flange 46 and into the opening 49 formed by these edges. Closing the grille 41 holds filter assembly 13 in place within the rectangular opening to duct 14. The dimensions of side panels 20a and 20b and of the filter element 16 itself must be chosen appropriately to allow filter element 16 to fit within the opening formed by the flange 46 edges. Of course, if there are components within duct 14 close to the opening formed by flange 46, then the installation may not be mechanically compatible with the filter assembly 13 design shown.

Flange 28 is intended to make contact with ridge 36 as shown in FIG. 5 when grille 41 is closed. Pressure of ridge 36 against flange 28 holds flange 31 and its gasket 35 firmly against flange 46. To further prevent air leakage around filter assembly 13, gasket 48 can be installed along the edge of flange 46 and adjacent to filter end panels 17. There is foam rubber gasket material available with adhesive coating on one surface which can be attached to project slightly into the opening formed by flange edges 45 so as to contact the outer surface of end panel 17 and form a close if not perfectly air tight seal to end panel 17.

An alternative design may have ref. no. 35 designating a strip magnet permanently bonded to flange 31 and whose attractive force to a ferrous flange 46 simultaneously holds filter element 16 in place and forms a good air seal between flange 46 and flange 31. In this design, there will be no need for flange 28.

In fact, vertical installations such as shown in FIG. 2 may not even require a flange 28 interacting with ridge 36 to properly hold filter assembly 13 in position within intake 15. Note that the direction of air flow is into duct 49, so that the force generated by the pressure drop across filter element 16 tends to press flanges 31 against flange 46. As dirt collects on filter medium 19, pressure drop across medium 19 tends to increase, further increasing the force with which flange 31 is held against flange 46 and reducing air leakage through any gaps in this interface.

A resilient detent flange 34 as shown in FIG. 6 is an alternative to the use of support flange 28 or magnetic attraction to hold filter assembly 13 in its proper position within opening 49. Detent flange 34 funs the entire length of side panel 20. In the embodiment shown, arm 34 is integral with flange 32, and interferingly contacts edge 45. As filter assembly 13 is inserted into opening 49, each flange 34 resiliently deflects slightly, and thereafter returns to the position shown in FIG. 6, where filter assembly 13 is held in the desired position within opening 49. Note that the direction of air flow is into duct 49, so that the force generated by the pressure drop across filter element 15 tends to press flanges 31 against flange 46.

The preceding describes our invention and variations to it, all of which are intended to be defined by the claims following.

What we claim is:

1. A component for mating with an end panel of a deep format filter element to form in combination therewith a filter assembly suitable for replacing a shallow rectangular filter element in a rectangular filter mount opening of an air duct, said opening having an interior peripheral duct flange having a mating surface facing outwardly from the duct and an interior edge defining a air stream passage, for receiving the shallow filter element, said filter mount opening including a cover movable from an open position spaced away from the duct flange to a closed position in spaced relation to the duct flange, said cover having a mating surface on the periphery and in facing and spaced relation to the duct flange when the cover is in the closed position, said cover mating surface and duct flange for cooperating to support a shallow filter element in the air stream passage, wherein said component comprises an elongate panel having oppositely facing inner and outer surfaces, first and second ends, inner and outer edges running between the first and second ends, a flange extending at approximately right angles from the panel's inner surface for supporting the side plane of the deep filter element, and a feature at each end for mating with the filter element's end panel, and said component having a sealing flange and a linear support flange each mounted on and projecting from the outer surface, said sealing and support flanges in spaced and parallel relationship to each other, said sealing flange having a sealing face generally facing the inner edge of the component and extending along substantially the entire length of the component, and said support flange having a support face facing away from the first flange's sealing face, wherein when said component is assembled to form a part of said filter assembly and said filter assembly is mounted in the filter mount opening, said sealing face forms surface contact with the peripheral duct flange and said support face cooperates with the cover and the mating surface thereof to urge the sealing face into contact with the peripheral duct flange when the filter assembly is mounted within the air stream passage and the cover is in the closed position, whereby the filter assembly is supported in the air stream passage and the sealing face forms a sealing engagement with the duct flange.

2. The component of claim 1, wherein the sealing flange is of substantially uniform height and the sealing face is substantially flat.

3. The component of claim 2, including a resilient gasket extending along the sealing face.

4. The component of claim 3, wherein the gasket has a uniform thickness.

5. The component of claim 1 wherein the sealing flange is attached to the outer surface between the inner and outer edges.

6. A frame for supporting a pleated filter element for installation in an air duct opening defined by a plurality of interior edges of a flat-faced interior peripheral flange, said frame having an inside structure for mating with the filter element, and an outer peripheral surface facing away from the inside structure, and further comprising a sealing flange extending laterally from the outer peripheral surface and approximately normal thereto, and a support flange extending laterally from the outer peripheral surface and spaced from said sealing flange.

7. The frame of claim 6, wherein the peripheral flange's interior edges define a substantially rectangular opening lying within a plane, and wherein an outer surface of the peripheral flange is substantially coplanar with said plane, and wherein the frame's flange sealingly contacts the peripheral flange's outer surface when the frame is installed in the opening.

8. The frame of claim 7, wherein the support flange has a predetermined spacing from the sealing flange.

9. A component for adapting a filter element to mount in a filter mount opening, said component having an elongate panel having first and second side edges, first and second end edges, and inner and outer surfaces; features adjacent said first and second end edges and said first and second side edges for attaching the component to the filter element and for supporting the filter element in engagement with the inner surface, for forming a filter assembly; said component having a sealing flange extending parallel to and spaced from the second side edge and projecting from the outer surface, and a support flange projecting from the outer surface and spaced from and parallel to the sealing flange.

10. The component of claim 9, wherein the support flange projects from the outer surface at the first side edge.

11. The component of claim 10, wherein the sealing flange extends from the first end edge to the second end edge.

12. The component of claim 10, wherein the sealing flange has a predetermined constant spacing from the support flange.

13. A component for adapting a filter element to mount in a filter mount opening, said component having an elongate panel having first and second side edges, first and second end edges, and inner and outer surfaces; features adjacent said first and second end edges and said first and second side edges for attaching the component to the filter element and for supporting the filter element in engagement with the inner surface, for forming a filter assembly; said component having a sealing flange extending parallel to and spaced from the second side edge and projecting from the outer surface, and a support flange comprising a resilient detent flange positioned to interferingly mate with the interior edge of the opening's flange, said detent urging the component's sealing face against the air duct opening's mating surface.

14. The component of claim 13, wherein the support flange extends continuously along the sealing flange.

* * * * *